Figure 1:
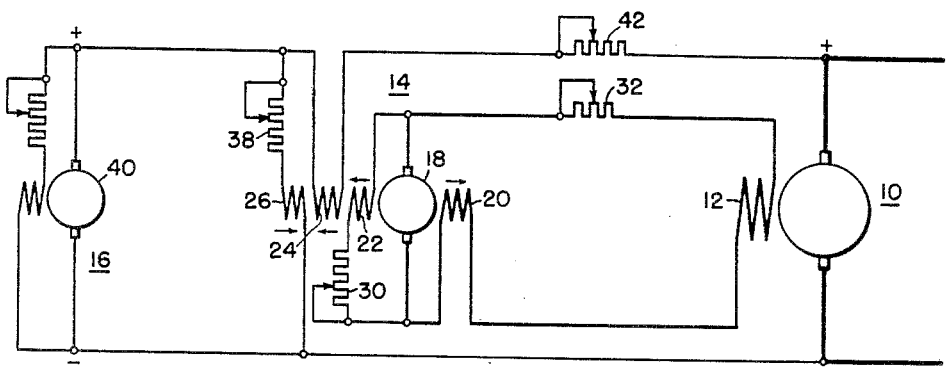

June 28, 1955  D. E. ABELL  2,712,108

GENERATOR REGULATOR

Filed Nov. 25, 1953

WITNESSES
Robert C. Baird
K. W. Thomas

INVENTOR
Donald E. Abell
BY
ATTORNEY

United States Patent Office 2,712,108
Patented June 28, 1955

2,712,108

GENERATOR REGULATOR

Donald E. Abell, Buffalo, N. Y., assignor to Westinghouse Electric Corporation, East Pittsburgh, Pa., a corporation of Pennsylvania Application November 25, 1953, Serial No. 394,265

5 Claims. (Cl. 322—36)

This invention relates to rotating regulators, and, more particularly, to means for increasing the gain of such regulators.

Heretofore, the gain of a rotating regulator has been increased by different expedients. However, these prior art expedients for increasing the gain of a rotating regulator brought about certain other disadvantages. For instance, if the resistance of the regulating loop including the control field, which heretofore was connected across the output of the generator being regulated, is decreased to thereby increase the gain of the rotating regulator, the power consumption in the regulating loop including the control field is increased. Such an increase in the power consumption in the control field oftentimes necessitates the provision of a different control field capable of dissipating the newly added power without injury thereto.

Often times when installing a rotating regulator, a reference voltage of equal magnitude to the regulated output voltage is not available. Therefore, it is desirable to provide a rotating regulator which will operate from a reference voltage which differs in magnitude from the magnitude of the regulated output voltage.

An object of this invention is to provide for increasing the gain of a rotating regulator, connected to control the output of a generator, without the necessity of providing a reference voltage of equal magnitude to the magnitude of the regulated output voltage of the generator, by so interconnecting a control field of the rotating regulator that the control field is responsive to the difference between the magnitude of the reference voltage and the magnitude of the output voltage of the generator.

Another object of this invention is to provide for increasing the gain of a rotating regulator, a control field of which is connected to control the output of the generator, without increasing the power dissipated in the control field, by so interconnecting the control field that it is responsive to the difference between the magnitude of a reference voltage and the magnitude of the output voltage of the generator, to thereby provide a minimum of control voltage in the regulating loop including the control field, which, in turn, permits the resistance of the regulating loop to be decreased without increasing the current flow through the control field and this increases the gain of the rotating regulator without increasing the power dissipated in the control field.

Figure 2:
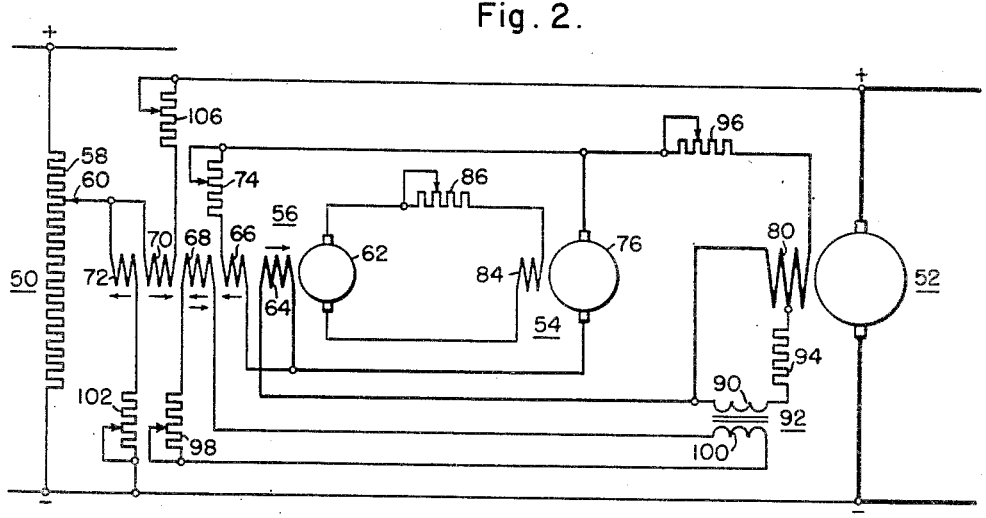

Other objects of this invention will become apparent from the following description when taken in conjunction with the accompanying drawing, in which:

Figure 1 is a schematic diagram of control apparatus and circuits embodying a teaching of this invention in which the reference voltage for the control apparatus is of lesser magnitude than the regulated output voltage of the generator associated with the control apparatus, and Fig. 2 is a schematic diagram of control apparatus and circuits illustrating another embodiment of the teachings of this invention in which the magnitude of the reference voltage for the control apparatus is of greater magnitude than the regulated output voltage of the generator associated with the control apparatus.

Referring to Fig. 1, there is illustrated control apparatus for maintaining the magnitude of the output voltage of a generator 10, having a field winding 12, substantially constant. In general, the control apparatus includes a rotating regulator or control exciter 14 for controlling the operation of the generator 10, in particular the magnitude of its output voltage, and control means 16 having a direct-current output reference voltage, which is of lesser magnitude than the regulated output voltage of the generator 10.

Broadly, the control exciter 14 comprises an armature 18, a series self-energizing field 20, an anti-hunt field 22, a control field 24, and a pattern field 26. As is customary, the control exciter 14 is operated on the straight portion of its saturation curve. Under steady-state conditions, the self-energizing field 20 furnishes all of the ampere-turns required to generate the output voltage of the generator 10, with the control field 24 and the pattern field 26 having to supply only the controlling and stabilizing ampere-turns. However, the algebraic sum of the ampere-turns of all of the control exciter fields 20, 22, 24 and 26 determines the magnitude of the output voltage of the control exciter 14, and thus the magnitude of the output voltage of the generator 10.

As is normal practice, the anti-hunt field 22 is connected in the self-energizing circuit differentially with respect to the series self-energizing field 20 so as to respond to changes in the armature voltage of the control exciter 14 much faster than does the load (not shown) connected to the output of the generator 10. Thus, the anti-hunt field 22 is able to exert a stabilizing effect on the control exciter 14, and, therefore, substantially prevents oscillations in the control apparatus illustrated in Fig. 1.

In order to tune the control exciter 14 by adjusting the net effect resistance line, of the self-energizing field 20 in combination with the anti-hunt field 22, so as to coincide with the air-gap line of the control exciter 14, variable resistors 30 and 32 are provided. As illustrated, the variable resistor 32 is connected in series circuit relationship with the field winding 12 of the generator 10 and with the self-energizing field 20 of the control exciter 14. Thus, the field winding 12 of the generator 10 and the self-energizing field 20 of the control exciter 14 are responsive to the output voltage of the control exciter 14, as it appears across the armature 18.

In this instance, the pattern field 26 is connected in series circuit relationship with a variable resistor 38, the series circuit being connected across the armature 40 of a direct-current exciter which, in this instance, comprises the control means 16. However, it is to be understood that the control means 16 could comprise any suitable means for producing a substantially constant direct-current reference voltage.

In accordance with the teachings of this invention, the control field 24 of the control exciter 14 is so connected to the control means 16 and to the generator 10 as to be responsive to the difference in the magnitude of the reference voltage as produced by the control means 16 and the magnitude of the output voltage of the generator 10. In particular, the control field 24 is connected in series circuit relationship with a variable resistor 42, the series circuit being connected between one side of the output of the control means 16 and one side of the output of the generator 10, the other side of the output of the control means 16 being connected to the other side of the output of the generator 10. The variable resistor 42 is provided in order to be able to adjust the magnitude of the current flow through the control field 24. It is to be noted that a minimum of control voltage appears across the regulating loop, which extends from the positive side of the output of the generator 10 through the variable resistor 42 and the control field 24, to the positive side of the control means 16. This in turn permits the resistance of the regulating loop to be decreased without increasing the current flow through the control field 24, and thus increases the gain of the control exciter 14 without increasing the power dissipated in the control field 24.

By adjusting the variable resistors 38 and 42, a proper balance between the ampere-turns of the pattern field 26 and the ampere-turns of the control field 24 of the control exciter 14 can be obtained when the output voltage of the generator 10 is at its regulated value. When the reference voltage, as produced by the control means 16, is of lesser magnitude than the regulated output voltage of the generator 10, the control field 24 acts differentially with respect to the pattern field 26 and with respect to the self-energizing field 20 of the control exciter 14. Thus, in operation, the ampere-turns of the control field 24 balance the ampere-turns of the pattern field 26 when the output voltage of the generator 10 is at the regulated value.

The operation of the control apparatus illustrated in Fig. 1 in maintaining the output voltage of the generator 10 will now be described. Assuming the magnitude of the output voltage of the generator 10 increases to a value above the regulated value, then the current flow through the control field 24 of the control exciter 14 is increased. Since the control field 24 is disposed to act differentially with respect to the self-energizing field 20 of the control exciter 14, the output voltage of the control exciter 14 is decreased. With a decrease in the magnitude of the output voltage of the control exciter 14, the current flow through the control field 24 of the generator 10 is decreased to thereby return the output voltage of the generator 10 to its regulated value.

On the other hand, assuming the magnitude of the output voltage of the generator 10 decreases to a value below the regulated value, then the magnitude of the current flow through the control field 24 of the control exciter 14 decreases to thereby increase the magnitude of the output voltage of the control exciter 14. With an increase in the magnitude of the output voltage of the control exciter 14, the current flow through the field winding 12 of the generator 10 increases to thereby return the output voltage of the generator 10 to its regulated value.

Referring to Fig. 2, there is illustrated another embodiment of the teachings of this invention. The main distinction between the apparatus illustrated in Figs. 1 and 2 is that in the apparatus of Fig. 2 the direct-current reference voltage as produced by control means 50 is of greater magnitude than the regulated direct-current output voltage of a generator 52. Another distinction between the apparatus illustrated in Figs. 1 and 2 is that in the apparatus of Fig. 2 a main exciter 54 is provided in addition to a control exciter 56. In this instance, the control means 50 is a rheostat or potentiometer having a resistor member 58 and a movable contact member 60, the resistor member 58 being connected across a source of substantially constant direct-current voltage.

Broadly, the control exciter 56 comprises an armature 62, a series self-energizing field 64, an antihunt field 66, a damping field 68, a control field 70, and a pattern field 72. As was the case with the apparatus illustrated in Fig. 1, the anti-hunt field 66 is connected and disposed to act differentially with respect to the series self-energizing field 64 of the control exciter 56. In particular, the anti-hunt field 66 is connected in series circuit relationship with a variable resistor 74, the series circuit being connected across the armature 76 of the main exciter 54, so that the anti-hunt field 66 of the control exciter 56 is responsive to the rate of change of voltage across the armature 76.

In the embodiment of Fig. 2, the field winding 80 of the generator 52 and the self-energizing field 64 of the control exciter 56 are responsive to the magnitude of the output voltage of the main exciter 54, as it appears across the armature 76. Therefore, it follows that the field winding 80 of the generator 52 and the self-energizing field 64 of the control exciter 56 are also responsive to the magnitude of the output voltage of the control exciter 56, since the armature 62 of the control exciter 56 is connected to the field winding 84 of the main exciter 54 through a variable resistor 86. Thus, in operation, the control exciter 56 controls the magnitude of the output voltage of the main exciter 54 which, in turn, controls the magnitude of the current flow through the field winding 80 of the generator 52, and thus the magnitude of the output voltage of the generator 52.

In particular, the self-energizing field 64 of the control exciter 56 is rendered responsive to the output voltage of the main exciter 54 by means of a circuit which extends from one side of the armature 76, of the main exciter 54, through the self-energizing field 64, the field winding 80 of the generator 52 and a variable resistor 96, to the other side of the armature 76 of the main exciter 54. By adjusting the variable resistors 96 and 74, the control exciter 56 can be tuned so that the net effective resistance line, of the self-energizing field 64 in combination with the anti-hunt field 66, can be adjusted to coincide with the air-gap line of the control exciter 56.

In this instance, the damping winding 68 is responsive to the rate of change of the current flow through the field winding 80 of the generator 52. As illustrated, a series circuit including the damping winding 68 of the control exciter 56 and a variable resistor 98 is connected across the secondary winding 100 of a damping transformer 92 having a primary winding 90 that is connected in series circuit relationship with a current limiting resistor 94. The series circuit including the primary winding 90 and the resistor 94 is connected across a portion of the field winding 80 of the generator 52. Thus, in operation, the damping winding 68 responds to the magnitude of the voltage across the secondary winding 100 of the damping transformer 92, which voltage is of either polarity depending upon whether the current flow through the field winding 80 of the generator 52 is increasing or decreasing at the particular instant. The variable resistor 98 is provided in order to vary the effect produced by the damping field 68 of the control exciter 56. Thus, by properly adjusting the variable resistors 74 and 98, oscillations in the control apparatus illustrated in Fig. 2 can be substantially eliminated.

As illustrated, the pattern field 72 of the control exciter 56 is connected to be responsive to the magnitude of the direct-current output reference voltage of the control means 50. In particular, a series circuit including the pattern field 72 and a variable resistor 102 is connected to the output of the control means 50, one end of the series circuit being connected to the movable contact member 60 and the other end of the series circuit being connected to the negative side of the resistor 58. In the embodiment of Fig. 2, the pattern field 72 is so connected and disposed as to act differentially with respect to the self-energizing field 64 of the control exciter 56.

In accordance with the teachings of this invention, the control field 70 of the control exciter 56 is so connected to the control means 50 and the generator 52 as to be responsive to the difference in the magnitude of the reference voltage as produced by the control means 50 and the magnitude of the output voltage of the generator 52. As illustrated, the control field 70 of the control exciter 56 is connected between one side of the output of the control means 50, that is the movable contact member 60, and one side of the output of the generator 52. The other side of the output of the control means 50, that is the negative side of the resistor 58, is connected to the other side of the output of the generator 52. Thus, a minimum of control voltage appears across the regulating loop, which extends from the positive side of the output of the generator 52 through a variable resistor 106 and the control field 70 of the control exciter 56, to the movable contact member 60 of the control means 50. This in turn permits the resistance of the regulating loop to be decreased without increasing the current flow through the control field 70, and thus increases the gain of the control exciter 56 without increasing the power dissipated in the control field 70.

In order to obtain a proper balance between the ampere-turns of the pattern field 72 and the ampere-turns of the control field 70 of the control exciter 56, the variable resistor 106 is connected in series circuit relationship with the control field 70, it being understood that the control field 70 is so connected and disposed as to act differentially with respect to the pattern field 72. In practice, both the variable resistors 102 and 106 are adjusted in order to obtain a substantially equal number of ampere-turns for the control field 70 and for the ampere-turns of the pattern field 72, when the output voltage of the generator 52 is at its regulated value.

The operation of the control apparatus illustrated in Fig. 2 in maintaining the output voltage of the generator 52 substantially constant will now be described. Assuming the magnitude of the output voltage of the generator 52 increases to a value above its regulated value, then the magnitude of the current flow through the control field 70 of the control exciter 56 decreases. With a decrease in the current flow through the control field 70, which acts cumulatively with the self-energizing field 64, the output voltage of the control exciter 56 decreases to thereby decrease the current flow through the field winding 84 of the main exciter 54. With a decrease in the current flow through the field winding 84, the output voltage of the main exciter 54 decreases to thereby decrease the current flow through the field winding 80 of the generator 52, and thus return the magnitude of the output voltage of the generator 52 to its regulated value.

On the other hand, assuming the output voltage of the generator 52 decreases to a value below its regulated value, then the current flow through the control field 70 of the control exciter 56 increases to thereby increase the magnitude of the output voltage of the control exciter 56. With an increase in the magnitude of the output voltage of the control exciter 56, the current flow through the field winding 84 of the main exciter 54 increases to thereby increase the magnitude of the output voltage of the main exciter 54. With an increase in the magnitude of the output voltage of the main exciter 54, the current flow through the field winding 80 of the generator 52 increases to thereby return the magnitude of the output voltage of the generator 52 to its regulated value.

The apparatus embodying the teachings of this invention has several advantages. For instance, the gain of the control exciter or rotating regulator can be increased without increasing the power dissipated in its control winding. In addition, this gain can be accomplished even though the reference voltage available for the control exciter differs in magnitude from the regulated output voltage of the generator whose operation is controlled by means of the control exciter.

Since certain changes may be made in the above apparatus and circuits and different embodiments of the invention could be made without departing from the scope thereof, it is intended that all matter contained in the above description or shown in the accompanying drawing shall be interpreted as illustrative and not in a limiting sense.

I claim as my invention:

1. In control apparatus for controlling the magnitude of the output voltage of a generator having a field winding, the combination comprising, a control exciter including an armature, a self-energizing field, a pattern field, and a control field, the self-energizing field of the control exciter and the field winding of the generator being responsive to the output of the control exciter, control means having an output reference voltage whose magnitude is less than the magnitude of the output voltage of the generator the pattern field being connected across the output of said control means and so disposed as to act cumulatively with respect to the self-energizing field, and circuit means for connecting the control field of the control exciter between the output of the generator and the output of said control means so that said control field is responsive to the difference in the magnitude of said reference voltage and the magnitude of the output voltage of the generator, said control field being disposed to act differentially with respect to the self-energizing field and the pattern field.

2. In control apparatus for controlling the magnitude of the output voltage of a generator having a field winding, the combination comprising, a control exciter including an armature, a self-energizing field, a pattern field, and a control field, the self-energizing field of the control exciter and the field winding of the generator being responsive to the output of the control exciter, control means having an output reference voltage whose magnitude is greater than the magnitude of the output voltage of the generator, the pattern field being connected across the output of said control means and so disposed as to act differentially with respect to the self-energizing field, and circuit means for connecting the control field of the control exciter between the output of the generator and the output of said control means so that said control field is responsive to the difference in the magnitude of said reference voltage and the output voltage of the generator, said control field being disposed to act cumulatively with respect to the self-energizing field.

3. In control apparatus for controlling the magnitude of the direct-current output voltage of a generator, the combination comprising, a control exciter connected to control the operation of the generator, control means having a direct-current output reference voltage whose magnitude differs from the magnitude of the direct-current output voltage of the generator, a pattern field for the control exciter, the pattern field being connected to be responsive to said reference voltage, a control field for the control exciter, and circuit means for connecting said control field between one side of the output of said control means and one side of the output of the generator and for connecting the other side of the output of said control means to the other side of the output of the generator, so that said control field is responsive to the difference in the magnitude of said reference voltage and the magnitude of the output voltage of the generator.

4. In control apparatus for controlling the magnitude of the direct-current output voltage of a generator having a field winding, the combination comprising, a control exciter including an armature, a self-energizing field, a pattern field, and a control field, the self-energizing field of the control exciter and the field winding of the generator being responsive to the output of the control exciter, control means having a direct-current output reference voltage whose magnitude is less than the magnitude of the direct-current output voltage of the generator, the pattern field being connected across the output of said control means and so disposed as to act cumulatively with respect to the self-energizing field, and circuit means for connecting said control field between one side of the output of said control means and one side of the output of the generator and for connecting the other side of the output of said control means to the other side of the output of the generator so that said control field is responsive to the difference in the magnitude of said reference voltage and the magnitude of the output voltage of the generator, said control field being disposed to act differentially with respect to the self-energizing field and the pattern field.

5. In control apparatus for controlling the magnitude of the direct-current output voltage of a generator having a field winding, the combination comprising, a control exciter including an armature, a self-energizing field, a pattern field, and a control field, the self-energizing field of the control exciter and the field winding of the generator being responsive to the output of the control exciter, control means having a direct-current output reference voltage whose magnitude is greater than the magnitude of the direct-current output voltage of the generator, the pattern field being connected across the output of said control means and so disposed as to act differentially with respect to the self-energizing field, and circuit means for connecting said control field between one side of the output of said control means and one side of the output of the generator and for connecting the other side of the output of said control means to the other side of the output of the generator so that said control field is responsive to the difference in the magnitude of said reference voltage and the magnitude of the output voltage of the generator, said control field being disposed to act cumulatively with respect to the self-energizing field.

References Cited in the file of this patent

UNITED STATES PATENTS 1,843,250   Spencer _____ Feb. 2, 1932